United States Patent
Raychaudhuri et al.

[11] Patent Number: 5,733,623
[45] Date of Patent: Mar. 31, 1998

[54] RECORDING MEDIA FOR RECORDABLE ELEMENT

[75] Inventors: Pranab K. Raychaudhuri, Rochester; Fridrich Vazan, Pittsford; George R. Olin, Webster; Yuan-Sheng Tyan, Webster, all of N.Y.

[73] Assignee: Eastman Kodak Company, Rochester, N.Y.

[21] Appl. No.: 732,825

[22] Filed: Oct. 15, 1996

[51] Int. Cl.$^6$ .......................................................... B32D 3/00
[52] U.S. Cl. .......................... 428/64.1; 428/64.2; 428/64.4; 428/64.5; 428/64.6; 428/457; 428/913; 430/270.11; 430/495.1; 430/945; 369/283; 369/288
[58] Field of Search ................... 428/64.1, 64.2, 428/64.4, 64.5, 64.6, 412, 457, 913; 430/270.1, 270.11, 495.1, 945; 369/283, 288

[56] References Cited

U.S. PATENT DOCUMENTS 5,585,158 12/1996 Raychaudhuri et al. ............... 428/64.1

*Primary Examiner*—Patrick Ryan
*Assistant Examiner*—Elizabeth Evars
*Attorney, Agent, or Firm*—Raymond L. Owens

[57] ABSTRACT

A recordable element with improved performance, and a method of making such element is disclosed. The recordable element includes a substrate and an optical recording layer deposited on the substrate, wherein the optical recording layer is formed of $Te_aGe_bC_cH_dO_e$ where a, b, c, d, and e are atomic percents such that $a+b+c+d+e=100$, and wherein $10<a<40$, $10<b<60$, $5<c<35$, and $15<(c+d)<65$ and $e \geq 0$; a metal layer over the optical recording layer; and the recording element having its properties changed by heat treatment for a time and temperature selected so as to significantly improve jitter, window margin, reflectivity, and recording sensitivity performance.

15 Claims, 1 Drawing Sheet

RECORDING MEDIA FOR RECORDABLE ELEMENT

FIELD OF THE INVENTION

The present invention relates to optical recording elements and methods of forming such elements with improved performance.

BACKGROUND OF THE INVENTION

Although successful applications have been made of many organic and inorganic media in optical recording, it is difficult with these media to meet the requirements for many emerging applications. It is desired to invent new media with special emphasis on the improvement of data density, wavelength dependence of reflectivity, recording sensitivity, nonlinearity, peak shift, jitter, and window margin.

Jitter of a recorded feature is related to its ability of being detected without error during read back. Transitions from nominally identical recorded feature will not be read back precisely at the same time because of the slight variation in feature length and shape and system noise. This gives rise to a spread in detection time. A detection time window can read all these features if the distribution is so narrow as to lie completely within the time window. On the other hand, if the distribution is broad such that some of the transitions occur outside the window, they will result in a decoding error. Jitter is a measure of the overall noise and is the square root of the variance of the distribution of detection time commonly modeled as a Gaussian curve. The distribution of detection time may not be exactly centered in the timing window which will increase the probability of a decoding error even for a narrow distribution. The window margin (Wm) is a derived parameter involving jitters and peak shifts of all recorded features. The lower the jitters and peak shifts, the higher is the Wm. The Wm can be viewed as a figure of merit in that the discs with higher Wm has a greater probability of successful read back than the one with lower Wm. Also the disc with higher Wm is expected to be read back by a wider variety of readers than the one with lower Wm that is otherwise similar.

SUMMARY OF THE INVENTION

Therefore it is an object of this invention to provide recording media with markedly improved properties, particularly with respect to jitter, nonlinearity, and Wm.

This object is achieved by a recordable element with improved performance, comprising:

a) a substrate and an optical recording layer deposited on the substrate, wherein the optical recording layer is formed of $Te_aGe_bC_cH_dO_e$ where a, b, c, d, and e are atomic percents such that $a+b+c+d+e=100$, and wherein $10<a<40$, $10<b<60$, $5<c<35$, and $15<(c+d)<65$ and $e\geq 0$;

b) a metal layer over the optical recording layer; and c) the recording element having its properties changed by heat treatment for a time and temperature selected so as to significantly improve jitter, window margin, reflectivity, and recording sensitivity performance.

This object is further achieved by a method of making a recordable element with improved performance comprising the steps of:

a) forming a substrate and depositing on the substrate an optical recording layer having at least two sublayers of different composition comprising $Te_aGe_bC_cH_dO_e$ where a, b, c, d, and e are atomic percents such that $a+b+c+d+e=100$, and wherein a, b, c, d, and e are atomic percents and $10<a<40$, $10<b<60$, $5<c<35$, and $15<(c+d)<65$ and $e\geq 0$;

b) forming a metal layer over the optical recording layer; and c) heat treating the recording element for a time and temperature selected so as to significantly improve jitter, window margin, reflectivity, and recording sensitivity performance.

ADVANTAGES

The media produced in accordance with the present invention have improved performance parameters including reflectivity, recording sensitivity, peak shift, nonlinearity, jitter, and window margin.

DETAILED DESCRIPTION OF THE INVENTION

Figure 1:
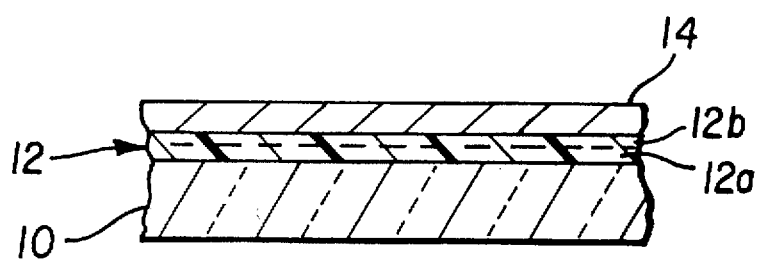
FIG. 1 is a schematic representation, in cross-section, of one element in accordance with the invention.

It is an important feature of the present invention that the recording layer is selected from the Te:Ge:C:H:O system. A preferred optical element is shown in FIG. 1. The substrate 10 has thereon a recording layer 12 and a reflective layer 14. The recording layer preferably is a bilayer having two sublayers 12a and 12b (a bilayer structure), although more than two sublayers or a continuously graded layer can be used in accordance with the present invention. Protective layers are commonly used on reflector but will not be discussed since they are not necessary for the practice of this invention.

Recording is accomplished by marking the recording layer 12 with a write laser focused on the recording layer 12. The focused laser beam heats the recording layer to temperatures substantially above the room temperature and induces changes in the media. The likely changes may include agglomeration of the metallic components in the layer, or the dissociation of material to form gaseous species which, in turn, causes the deformation of the media package in the form of bubbles, voids, or pits, etc. Some distortion of the substrate material might also be induced. In any event, the combination of some or all of these changes forms marks which can then be read back by the focused read laser beam. For a more complete explanation of the optical recording and play back processes as well as the construction of compact discs, see *Optical Recording*, Allan B. Marchant (1990).

The Substrate 10

The substrate 10 can be made from optically transparent resins with or without surface treatment. The substrate is transparent and light which illuminates the recording layer 12 passes through the substrate 10. The preferred resins for the FIG. 1 embodiment are polycarbonate and polyacrylates. The substrate 10 may include a guide groove for laser tracking.

The Reflective Layer 14

The reflective layer can be any of the metals conventionally used for optical recording materials. Useful metals can be vacuum evaporated or sputtered. Gold is most commonly used. The reflector used here was a 700 Å Au layer sputter deposited in pure Ar.

The Recording Layer 12

The recording layer of the present invention is a sputtered layer having at least two sublayers of different composition comprising $Te_aGe_bC_cH_dO_e$ where a, b, c, d, and e are atomic percents such that a+b+c+d+e=100, and wherein 10<a<40, 10<b<60, 5<c<35, and 15<(c+d)<65 and e≧0.

The preferred method of recording layer deposition is DC reactive sputtering. An alloy-sputtering method can be used wherein a single target contains both Te and Ge. Alloy targets can be prepared by melt casting or powder metallurgy techniques. The practiced method of deposition is co-sputtering wherein each target contains a single element. The atmosphere contains a sputter gas such as Ar or Kr, and a reactive gas such as methane, acetylene, and other hydrocarbons. Useful films can also be prepared using other gases such as $H_2$, $CO_2$, etc.

Recording layers are deposited on polycarbonate substrates using a Uniline coater in Ar+ methane environment.

The sublayer 12a is first deposited on the substrate 10 under a low $CH_4$ flow rate for a predetermined time, after which the sublayer 12b having different composition than 12a, is deposited. Preferably, sublayer 12b is formed with an increased flow rate of $CH_4$. The combined thickness of the recording layer 12 is such that, when a gold reflective layer is deposited, the reflectivity of the recording element is about 70%. Forming the optical recording layer 12 as a bilayer is advantageous because the sensitivity of the bilayer element is greater than that of a single layer element of identical reflectivity. For a more detailed explanation of the deposition of the bilayer, see commonly assigned U.S. patent application Ser. No. 08\482,718 filed Jun. 7, 1995 entitled "Recordable Optical Element Using Low Absorption Materials" by Raychaudhuri et al, the disclosure of which is incorporated herein by reference.

Heat Treating

One of the important features of the invention is the heat treatment of recording elements. Unexpectedly, it has been discovered that, when the recording elements were subjected to heat treatment, the performance of the recording element was improved significantly. It has been found, as will be shown below, that the discs made usign the present invention exhibit improvement, among other parameters, in jitter and Wm.

Heat treatment can be accomplished by any number of well known techniques. For example, a plurality of discs can be mounted on a spindle, and that spindle and discs can be placed in an air oven. The temperature of the air oven is preselected and the discs are heat treated for a predetermined period of time. Thereafter, the spindle and discs are removed from the oven and are cooled in air until they reach room temperature. Benefits are generally improved at more elevated temperatures and longer periods of time. For example, it has been found that, at temperature of 50° C. or greater for time periods of 4 hours or more, significant improvements are made. The temperature and the time of heat treating are limited by the plasterizing of polycarbonate substrates so that the geometry of the disc and the groove structure in the disc, are not significantly altered.

Disc Measurements

The discs were tested using an automated tester including a Kodak PCD 600 writer/reader. The recording and read back were performed at the constant linear velocity of 2.8 m/s. The following parameters were determined: reflectivity ($R_{top}$) optimum recording power (ORP), written contrasts; and nonlinearity NL (maximum difference of peak shifts among all features) Wm and jitter. In the CD recording scheme there are 18 features—nine of them are made by laser exposures and are called marks and the rest nine are features created by not exposing to laser beam and are called lands. Their exposure times are expressed in mulitples of detection window width (115.7 ns). The 3T, 4T, 5T . . . 11T marks are made by exposing to laser beam for 3 detection widths, 4 detection widths, 5 detection widths, and so on. The marks are correspondingly designated as 3M, 4M, 5M . . . 11M with 3M being the smallest and 11M being the largest of the marks. Similarly there are nine lands designed as—3L, 4L, 5L . . . 11L. S3M, S4M, etc. are the jitters of the corresponding marks. S3L, S4L, etc. are the jitters of the corresponding lands between marks. The contrasts ($C_3$ and $C_{11}$) and jitters (S3M, S11M and S3L, S11L) presented in the examples are of the smallest and largest features.

EXAMPLE 1

A set of 24 discs were prepared in quick sequence under the following conditions:

Power input to each of the two Te targets (WTe)—37 Watts

Power input to each of the two Ge targets (WGe)—143 Watts

Argon flow rate ( SCCM, Ar)—9 standard cubic centimeter per minute (SCCM)

$CH_4$ flow rate for the sublayer 1 ( SCCM, $CH_4$ (1))—6.5 SCCM

Deposition time for the sublayer 1 (T1, s)—3.5 seconds (s)

$CH_4$ flow rate for the sublayer 2 ( SCCM, $CH_4$ (2))—10 SCCM

Deposition lime for the sublayer 2 ($T_2$, s) - 8 s

After the deposition each of the discs was coated with a 700 A gold reflector and finished with a spun on and UV cured protective lacquer coat. The discs were measured after 17 hours. The following were the control characteristics:

| |
| --- |
| $R_{top}$ (%) = 57.1 ± 0.3 |
| ORP (mW) = 9.7 ± 0.1 |
| $C_3$ (%) = 48.6 ± 1.0 |
| $C_{11}$ (%) = 73.3 ± 1.3 |
| NL (ns) = 23.2 ± 0.7 |
| S3M (ns) = 10.5 ± 0.1 |
| S3L (ns) = 11.8 ± 0.4 |
| S11M (ns) = 9.3 ± 0.2 |
| S11L (ns) = 12.9 ± 0.4 |
| Wm = 40.2 ± 1.3 |

The $R_{top}$ value of 57.1% measured by PCD 600 writer/reader corresponds to an R of 70% when measured by a spectrophotometer.

The $R_{top}$ reflectivity measured by the PCD 600 writer was lower than the spectrophotometric value because of substrate birefringence, groove structure of the disc substrate and optical crosstalk of the adjacent marks. All ORP's are referred to 60% $R_{top}$ (~73% R ) and are calculated from the experimentally determined write power and the disc reflectivity.

EXAMPLE 2

Six discs from the control group were subjected to treatment consisting of heating to 80° C. in air oven for 17 hours followed by normal cooling in air. The discs performance was determined at a radius within 2 mm of the radius used in control experiments. The results are:

| |
|---|
| $R_{top}$ (%) = 60.5 ± 0.3 |
| ORP (mW) = 9.6 ± 0.1 |
| $C_3$ (%) = 53 ± 1.0 |
| $C_{11}$ (%) = 82 ± 1.0 |
| NL (ns) = 12.7 ± 0.7 |
| S3M (ns) = 8.4 ± 0.1 |
| S3L (ns) = 9.0 ± 0.1 |
| S11M (ns) = 7.6 ± 0.1 |
| S11L (ns) = 9.0 ± 0.3 |
| Wm = 54.1 ± 0.6 |

It is clear that because of the modification effected by the present invention there occur significant improvements in $R_{top}$, contrasts, NL, jitters and Wm.

EXAMPLE 3

Another group of six discs from the control group were subjected to treatment consisting of heating to 90° C. in air oven for 17 hours followed by normal cooling in air. The discs performance was determined at a radius within 2 mm of the radius used in control experiments. The results are:

| |
|---|
| $R_{top}$ (%) = 61.9 ± 0.0 |
| ORP (mW) = 9.4 ± 0.1 |
| $C_3$ (%) = 53 ± 1.0 |
| $C_{11}$ (%) = 81 ± 1.0 |
| NL (ns) = 12.3 ± 0.5 |
| S3M (ns) = 8.6 ± 0.1 |
| S3L (ns) = 9.2 ± 0.1 |
| S11M (ns) = 7.7 ± 0.1 |
| S11L (ns) = 90.1 ± 0.3 |
| Wm = 53.6 ± 0.6 |

It is clear that because of the modification effected by the present invention there occur significant improvements in $R_{top}$, contrasts, NL, jitters and Wm. There appears to be a slight improvement in recording sensitivity.

EXAMPLE 4

Another group of six discs from the control group were subjected to treatment consisting of heating to 100° C. in air oven for 17 hours followed by normal cooling in air. The discs performance was determined at a radius within 2 mm of the radius used in control experiments. The results are:

| |
|---|
| $R_{top}$ (%) = 64.2 ± 0.3 |
| ORP (mW) = 9.3 ± 0.1 |
| $C_3$ (%) = 54 ± 1.0 |
| $C_{11}$ (%) = 80 ± 1.0 |
| NL (ns) = 12.4 ± 0.5 |
| S3M (ns) = 8.4 ± 0.1 |
| S3L (ns) = 9.5 ± 0.2 |
| S11M (ns) = 7.7 ± 0.2 |
| S11L (ns) = 9.1 ± 0.3 |
| Wm = 53.0 ± 0.8 |

It is clear that because of the modification effected by the present invention there occur significant improvements in $R_{top}$, contrasts, NL, jitters and Wm. There is a slight improvement in recording sensitivity.

EXAMPLE 5

Another group of six discs from the control group were subjected to treatment consisting of heating to 110° C. in air oven for 17 hours followed by normal cooling in air. The discs performance was determined at a radius within 2 mm of the radius used in control experiments. The results are:

| |
|---|
| $R_{top}$ (%) = 64.6 ± 0.6 |
| ORP (mW) = 8.7 ± 0.2 |
| $C_3$ (%) = 52 ± 1.0 |
| $C_{11}$ (%) = 80 ± 1.0 |
| NL (ns) = 11.3 ± 0.4 |
| S3M (ns) = 8.5 ± 0.3 |
| S3L (ns) = 9.6 ± 0.3 |
| S11M (ns) = 7.7 ± 0.3 |
| S11L (ns) = 9.1 ± 0.2 |
| Wm = 53.4 ± 1.3 |

It is clear that because of the modification effected by the present invention there occur significant improvements in $R_{top}$, contrasts, NL, jitters and Wm. The recording sensitivity was significantly improved.

EXAMPLE 6

Five identical discs designated as a, b, c, d, e were prepared under the following conditions:

Power input to each of the two Te targets (WTe)—40 Watts

Power input to each of the two Ge targets (WGe)—140 Watts

Argon flow rate (SCCM, Ar)—9 SCCM

CH4 flow rate for the sublayer 1 (SCCM, CH4 (1))—6.5 SCCM

Deposition time for the sublayer 1 (T1, s)—4.0 s $CH_4$ flow rate for the sublayer 2 (SCCM, CH4 (2))—10 SCCM Deposition time for the sublayer 2 (T2, s)—8 s After the deposition each of the discs was coated with a 700 A gold reflector and finished with a spun on and UV cured protective lacquer coat.

The disc a was a control disc. The discs b, c, d, e were subjected to treatment consisting of heating at 80°, 90°, 100° and 110° C., respectively, in air ovens for 16 hours followed by normal cooling in air.

All of these discs were measured in quick succession at about the same radius. Table 1 below shows that recording elements made in accordance with the present invention are significantly superior to the control one with respect to $R_{top}$, contrasts, writing recording sensitivity NL, jitter, and Wm.

TABLE 1

| Disc | Treatment Temp (C.) | Treatment Time (h) | $R_{top}$ (%) | ORP (mW) | $C_3$ (%) | $C_{11}$ (%) | NL (ns) | S3M (ns) | S3L (ns) | S11M (ns) | S11L (ns) | Wm (%) |
|---|---|---|---|---|---|---|---|---|---|---|---|---|
| a | | | 55.8 | 10.1 | 46 | 74 | 17.9 | 12.4 | 13.9 | 11.2 | 14.8 | 33.3 |
| b | 80 | 16 | 57.1 | 10.3 | 50 | 82 | 11.8 | 9.8 | 9.8 | 8.3 | 9 | 51.8 |
| c | 90 | 16 | 57.1 | 10.9 | 52 | 83 | 12.5 | 9.6 | 9.6 | 8.4 | 8.5 | 52.5 |

TABLE 1-continued

| Disc | Treatment Temp (C.) | Treatment Time (h) | $R_{top}$ (%) | ORP (mW) | $C_3$ (%) | $C_{11}$ (%) | NL (ns) | S3M (ns) | S3L (ns) | S11M (ns) | S11L (ns) | Wm (%) |
|---|---|---|---|---|---|---|---|---|---|---|---|---|
| d | 100 | 16 | 62.3 | 9.5 | 52 | 83 | 11.6 | 9.1 | 9.3 | 8.2 | 8.6 | 53.8 |
| e | 110 | 16 | 63.2 | 8.7 | 52 | 81 | 10.9 | 8.8 | 9.1 | 8 | 8.8 | 54.2 |

The invention has been described in detail with particular reference to certain preferred embodiments thereof, but it will be understood that variations and modifications can be effected within the spirit and scope of the invention.

Parts List

| | |
|---|---|
| 10 | substrate |
| 12 | recording layer |
| 12a | sublayer |
| 12b | sublayer |
| 14 | reflective layer |

We claim:

1. A recordable element with improved performance, comprising:
   a) a substrate and an optical recording layer deposited on the substrate, wherein the optical recording layer is formed of $Te_aGe_bC_cH_dO_e$ where a, b, c, d, and e are atomic percents such that a+b+c+d+e=100, and wherein 10<a<40, 10<b<60, 5<c<35, and 15<(c+d)<65 and e≧0;
   b) a metal layer over the optical recording layer; and
   c) the recording element having its properties changed by heat treatment for a time and temperature selected so as to significantly improve jitter, window margin, reflectivity, and recording sensitivity performance.

2. The element of claim 1 wherein the metal layer includes gold.

3. A recordable element with improved performance, compirisng:
   a) a substrate and an optical recording layer deposited on the substrate an optical recording layer having at least two sublayers of different composition wherein each sublayer comprises $Te_aGe_bC_cH_dO_e$ where a, b, c, d, and e are atomic percents such that a+b+c+d+e=100, and wherein 10<a<40, 10<b<60, 5<c<35, and 15<(c+d)<65 and e≧0;
   b) a metal layer over the optical recording layer; and
   c) heat treating the recording element for a time and temperature selected so as to significantly improve improve jitter, window margin, reflectivity, and recording sensitivity performance.

4. The element of claim 3 wherein the metal layer includes gold.

5. A recordable element with improved performance, comprising:
   a) a substrate and on the substrate deposited an optical recording layer having a graded composition comprising $Te_aGe_bC_cH_dO_e$ where a, b, c, d, and e are atomic percents such that a+b+c+d+e=100, and wherein 10<a<40, 10<b<60, 5<c<35, and 15<(c+d)<65 and e≧0;
   b) a metal layer over the optical recording layer; and
   c) the recording element having its properties changed by heat treatment for a time and temperature selected so as to significantly improve jitter, window margin, reflectivity, and recording sensitivity performance.

6. The element of claim 5 wherein the metal layer includes gold.

7. A method of making a recordable element with improved performance, comprising the steps of:
   a) forming a substrate and sputtering on the substrate an optical recording layer of $Te_aGe_bC_cH_dO_e$ where a, b, c, d, and e are atomic percents such that a+b+c+d+e=100, and wherein 10<a<40, 10<b<60, 5<c<35, and 15<(c+d)<65 and e≧0;
   b) forming a metal layer over the optical recording layer; and
   c) heat treating the recording element for a time and temperature selected so as to significantly improve jitter, window margin, reflectivity, and recording sensitivity performance.

8. The method of claim 7 wherein the metal layer includes gold.

9. The method of claim 7 wherein the temperature is greater than 50° C. and the time is greater than 4 hours.

10. A method of making a recordable element with improved performance comprising the steps of:
    a) forming a substrate and sputtering on the substrate an optical recording layer having at least two sublayers of different composition wherein each sublayer comprises $Te_aGe_bC_cH_dO_e$ where a, b, c, d, and e are atomic percents such that a+b+c+d+e=100, and wherein 10<a<40, 10<b<60, 5<c<35, and 15<(c+d)<65 and e≧0;
    b) forming a metal layer over the optical recording layer; and
    c) heat treating the recording element for a time and temperature selected so as to significantly improve improve jitter, window margin, reflectivity, and recording sensitivity performance.

11. The method of claim 10 wherein the metal layer includes gold.

12. The method of claim 10 where the temperature is greater than 50° C. and the time is for at least 4 hours.

13. A method of making a recordable element with improved performance comprising the steps of:
    a) forming a substrate and sputtering on the substrate an optical recording layer having a graded composition comprising $Te_aGe_bC_cH_dO_e$ where a, b, c, d, and e are atomic percents such that a+b+c+d+e=100 and wherein 10<a<40, 10<b<60, 5<c<35, and 15<(c+d)<65 and e≧0;
    b) forming a metal layer over the optical recording layer; and
    c) heat treating the recording element for a time and temperature selected so as to significantly improve improve improve jitter, window margin, reflectivity, and recording sensitivity performance.

14. The method of claim 13 where the temperature is greater than 50° C. and the time is for at least 4 hours.

15. The method of claim 13 wherein the metal layer includes gold.

* * * * *